C. OKA.
FRUIT CUTTING AND PITTING MACHINE.
APPLICATION FILED APR. 3, 1919.

1,339,364.

Patented May 4, 1920.
5 SHEETS—SHEET 1.

Inventor:
Charly Oka
ATTORNEY

C. OKA.
FRUIT CUTTING AND PITTING MACHINE.
APPLICATION FILED APR. 3, 1919.

1,339,364.

Patented May 4, 1920.
5 SHEETS—SHEET 2.

C. OKA.
FRUIT CUTTING AND PITTING MACHINE.
APPLICATION FILED APR. 3, 1919.

1,339,364. Patented May 4, 1920.
5 SHEETS—SHEET 3.

Inventor:
Charly Oka
John A. Naismith
BY
ATTORNEY

C. OKA.
FRUIT CUTTING AND PITTING MACHINE.
APPLICATION FILED APR. 3, 1919.

1,339,364.

Patented May 4, 1920.

INVENTOR
Charly Oka
BY John A. Naismith
HIS ATTORNEY

C. OKA.
FRUIT CUTTING AND PITTING MACHINE.
APPLICATION FILED APR. 3, 1919.

1,339,364.

Patented May 4, 1920.
5 SHEETS—SHEET 5.

INVENTOR
Charly Oka
By John A. Naismith
HIS ATTORNEY

UNITED STATES PATENT OFFICE.

CHARLY OKA, OF SANTA CLARA COUNTY, CALIFORNIA.

FRUIT CUTTING AND PITTING MACHINE.

1,339,364.   Specification of Letters Patent.   Patented May 4, 1920.

Application filed April 3, 1919. Serial No. 287,118.

*To all whom it may concern:*

Be it known that I, CHARLY OKA, a subject of the Emperor of Japan, and a resident of Santa Clara county, State of California, have invented certain new and useful Improvements in Fruit Cutting and Pitting Machines, of which the following is a specification.

My invention relates to a machine designed to receive and prepare apricots for drying, and the object of my invention is to provide a machine of the character indicated that will automatically position and feed apricots at stated intervals to a specially designed cutting and pitting mechanism and then place the cut fruit in its proper position on a tray for drying.

The principal framework of the machine consists of a plurality of vertical supporting members 1, longitudinally positioned connecting members 2, and transverse tie members 3.

The several mechanisms mounted on the framework comprises a dumping device A, a spreader B, an elevator C, a feeder D, a first positioner E, a second positioner F, a cutter and pitter G, an inverter H, a placer I, and tray feeding mechanism J.

Figures 14, 15, 16, 17, 18, 19, 20, 21, 22:
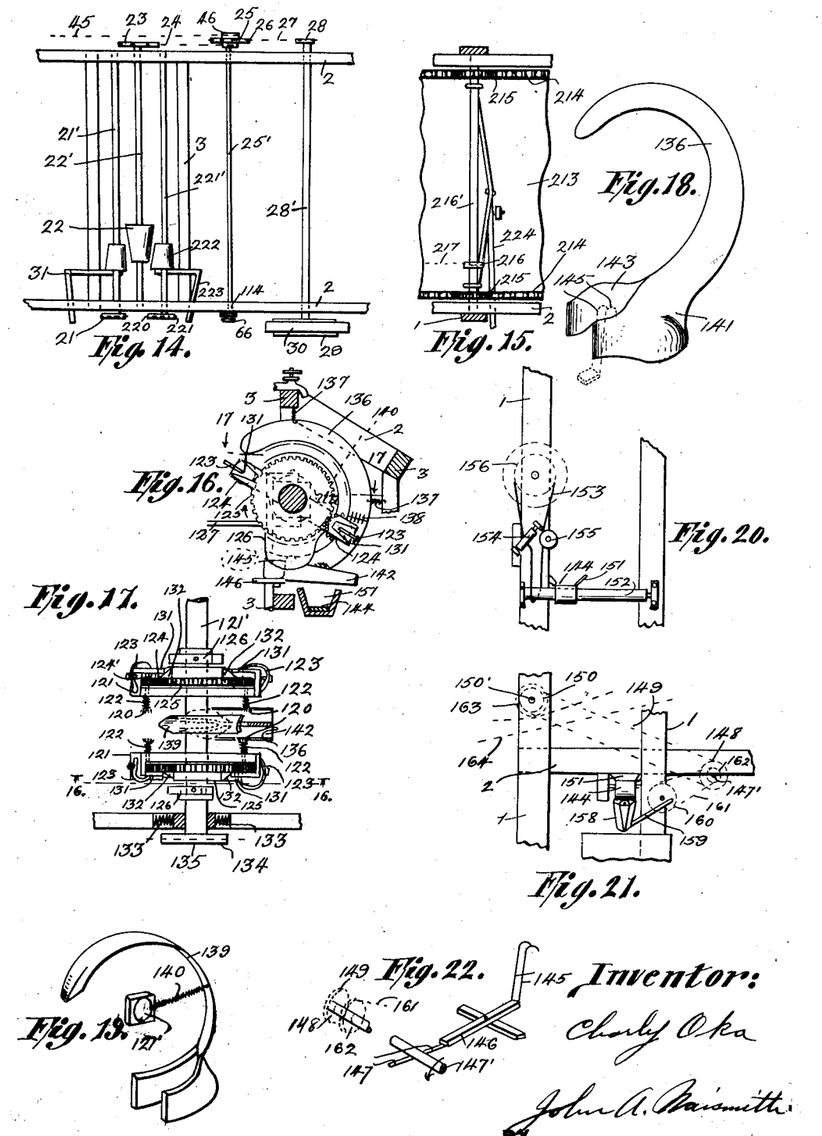
Fig. 14 is a plan view of the cone drive as mounted on my machine.
Fig. 15 is a plan view of the driving mechanism for the feeding rack of my machine.
Fig. 16 is an enlarged side elevation of the cutting and pitting devices.
Fig. 17 is a plan view of the parts shown in Fig. 16.
Fig. 18 is an enlarged perspective view of the knife shown in Fig. 16.
Fig. 19 is an enlarged perspective view of the guide coöperating with the knife shown in Fig. 16.
Fig. 20 is an enlarged detail elevation of the driving mechanism of the pit removing belt.
Fig. 21 is an enlarged detail elevation of the pit spreading spout and driving mechanism therefor.
Fig. 22 is a detail perspective view of the pit removing prongs.
Figures 23, 24, 26, 27, 28:
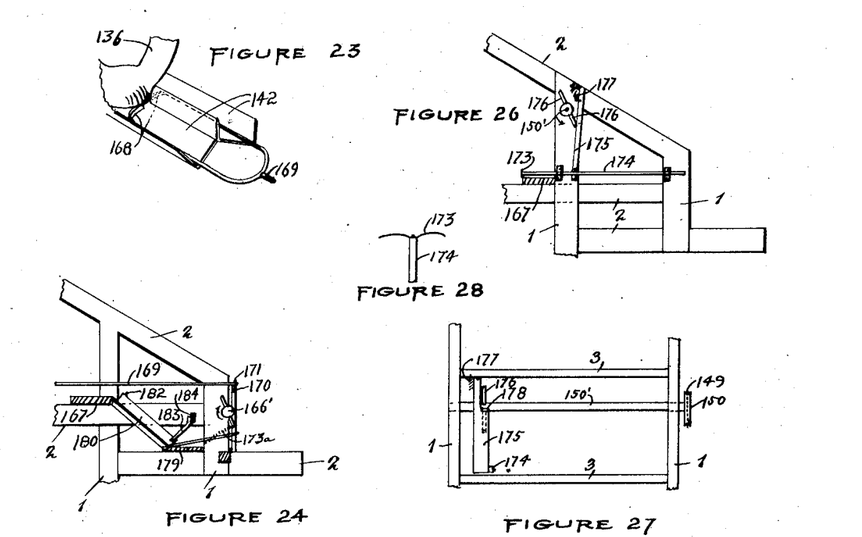
Fig. 23 is a detail perspective view of a portion of the cut-fruit removing fingers in position.
Fig. 24 is an enlarged detail end elevation of the mechanism for operating the device shown in Fig. 23.
Fig. 26 is an enlarged end elevation of the mechanism for removing cut fruit to distributing chutes.
Fig. 27 is a front elevation of the mechanism shown in Fig. 26.
Fig. 28 is a plan view of the end of the fruit moving device shown in Fig. 26.
Figure 25:
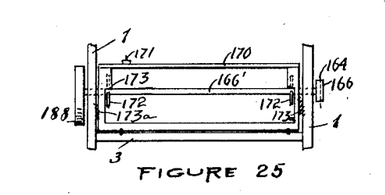
Fig. 25 is a front elevation of the mechanism shown in Fig. 24.
Figure 29:
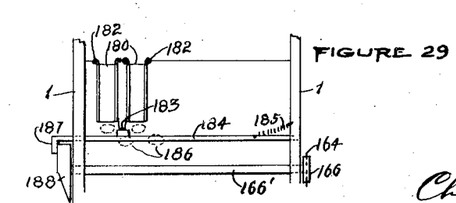
Fig. 29 is a plan view of the distributing chutes and operating mechanism therefor.
Figure 30:
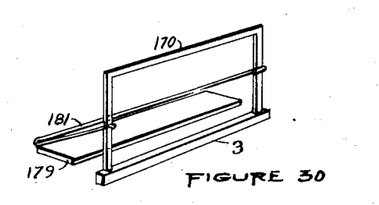
Fig. 30 is a perspective illustration of the mechanism for moving the fruit from the distributers to the inverters.
Figures 31, 32, 33:
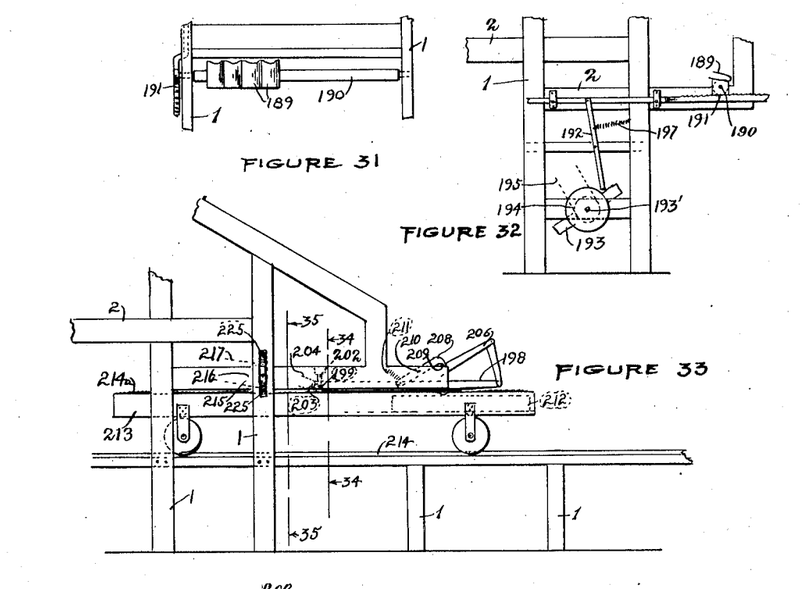
Fig. 31 is an enlarged plan view of the inverters and operating mechanism therefor.
Fig. 32 is an enlarged side elevation of the fruit inverting mechanism.
Fig. 33 is an enlarged side elevation of the tray carriage and fruit placing mechanism.
Figure 34:
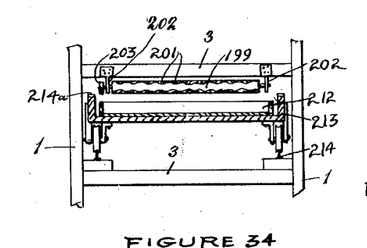
Fig. 34 is a sectional view on line 34—34 of Fig. 33.
Figure 35:
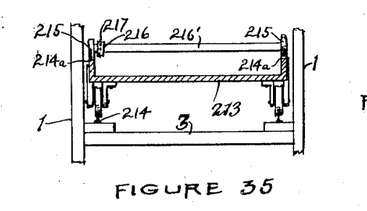
Fig. 35 is a sectional view on line 35—35 of Fig. 33.
Figure 36:
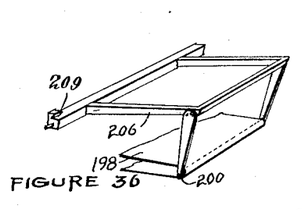
Fig. 36 is a perspective view of the forward canvas roller and its supporting rack.

The dumping mechanism consists of a hopper 4 pivoted at 5 and carrying a sector 6. On transverse shaft 7 is a gear 8 meshing normally with sector 6 and a sprocket 9 connected to a lower sprocket 10 by chain 11. Sprocket 10 is operated by chain and sprocket connections 12, 13, 14, 15, 16, 17, 17ª, 18, 19, 20 and 21 to cone drive 22, said latter being driven by chain and sprocket connections 23, 24, 25, 26, 27, 28, and drive wheel 29 and belt 30 connected to a source of power not shown. The cone connection to sprocket 21 is operated by a bell crank as 31 in Fig. 14. A foot release allows hopper 4 to fall back into position and consists of a lever 32 pivoted at 33 and operating an arm 34 connected to shaft 7, shaft 7 being held normally in position by spring 35, the release being effected by pulling upward the outer end of lever 36 pivoted at 37 and contacting with lever 32. The shafts throughout are designated by suitable numerals followed by the mark '.

Spreader B which receives the fruit from the hopper comprises a tray 38 hung in frame 1 by hangers 39 and is provided with a shaking mechanism to spread the fruit out before depositing in the elevator. This mechanism comprises a pitman 40 connected to tray 38 and eccentrically connected to a sprocket 41, sprocket 41 being operated by chain and sprocket connections 42, 43, 44, 45 and sprocket 46 on shaft 25'. Tray 38 has an apron 47 to prevent loss of fruit between the buckets of the elevator.

Figures 1, 5:
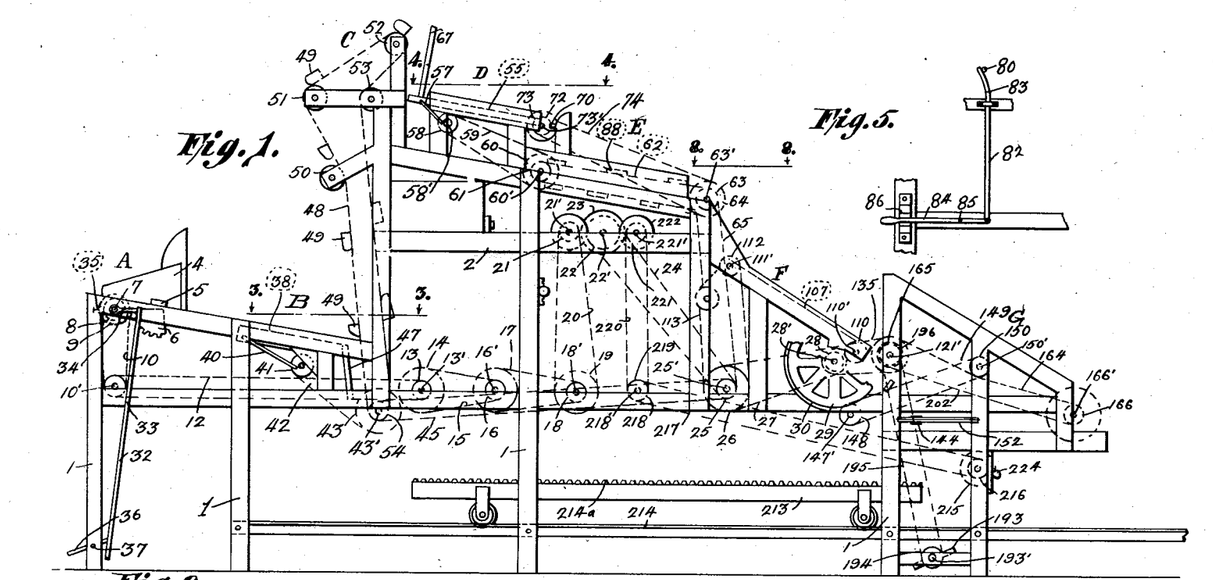
Figure 1 is a right side elevation of my invention.
Fig. 5 is a detail of the feeding device shown in Fig. 4.
Figures 2, 3, 4, 8, 10:
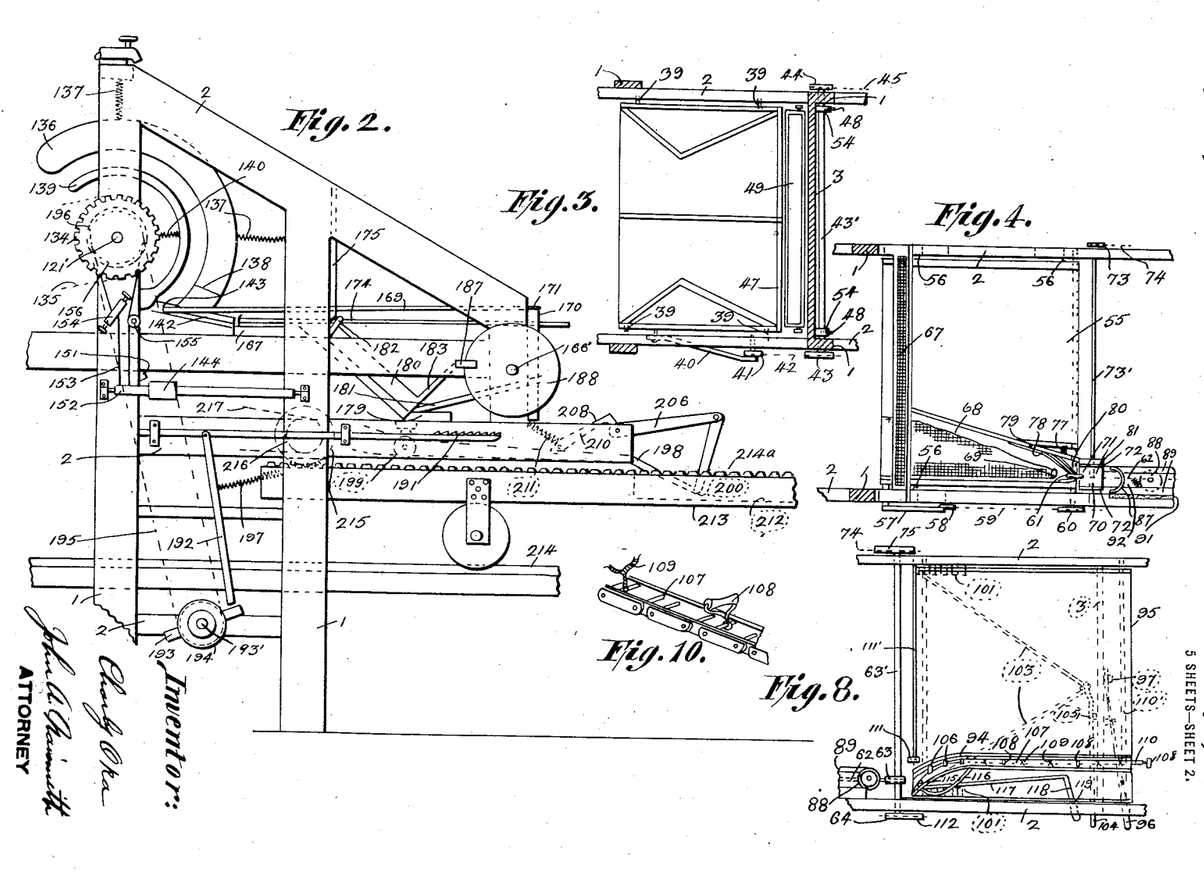
Fig. 2 is an enlarged side elevation of the cutting, pitting and delivering section of my invention.
Fig. 3 is a plan view on line 3—3 of Fig. 1.
Fig. 4 is a plan view on line 4—4 of Fig. 1.
Fig. 8 is a plan view on line 8—8 of Fig. 1.
Fig. 10 is an enlarged perspective view of a portion of the carrier shown in Fig. 8.

The elevator C comprises a pair of chains 48 carrying buckets 49 and operating on sprockets 50, 51, 52, 53 and 54, the latter being secured to shaft 43' as clearly shown in Fig. 3, the driving mechanism therefor being described above. The buckets 49 are long and narrow as shown to carry a limited quantity of fruit. The elevator is shown and described as constructed for supplying a plurality of the mechanisms following, but only one of said mechanisms is shown and described.

The feeder D, Fig. 4, comprises tray 55 supported in an inclined position in framework 1 by hangers 56 and is provided with a shaking mechanism to keep the fruit moving forwardly. The shaker consists of a pitman 57 attached to tray 55 and eccentrically connected to a sprocket 58, sprocket 58 being operated by chain and sprocket connections 59, 60, 61, 62, 63, 64, 65 and 66, the sprocket 66 being operated by shaft 25' and the connections hereinbefore described. A screen 67 is positioned upon frame 1 as shown to prevent scattering of the fruit when emptied from buckets 49. At 68 is a tapering screen cage mounted on tray 55 to receive the fruit and discharge the same in single file at outlet 69. At 70 is a depositing member comprising a pair of shelves 71 arranged between disks 72, the whole revolving with shaft 73' which is driven by sprocket 73, chain 74 and sprocket 75 on shaft 63'. The fruit is fed one at a time upon a shelf 71 by jaws 76, one jaw being normally held in the position shown by springs 77 and 78, the said jaw being hinged at 79 and carrying a spur 80. Cams 81 are formed on one disk 72 so as to contact with a spur 80 at stated intervals and automatically open jaws 76 and thereby deposit one fruit upon each shelf as it revolves. In order to adjust the jaws 76 to different sizes of fruit an arm 82 having a cam surface 83 is mounted to contact with spur 80 so that when forced upwardly by an arm 84 pivoted at 85 the space between the jaws will be widened. At 86 are placed a series of notches for holding lever 84 in position. A guard is shown at 87 to assure accurate placing of the fruit.

As each fruit leaves its respective shelf 71 it is placed in a pan 88, pan 88 being secured to chain 62 and moving between inclined guides 89. The fruit is caused to assume the position shown in dotted lines at 90, Fig. 6, by shaking pans 88. To secure this shaking motion I provide an undulating edge 91 in one guide 89 and an arm 92 on pan 88 to ride over undulations 91. A compression spring 93 connects pan 88 to chain 62 and coöperates with arm 92 in shaking pan 88.

Figures 6, 7, 9, 11, 12, 13:
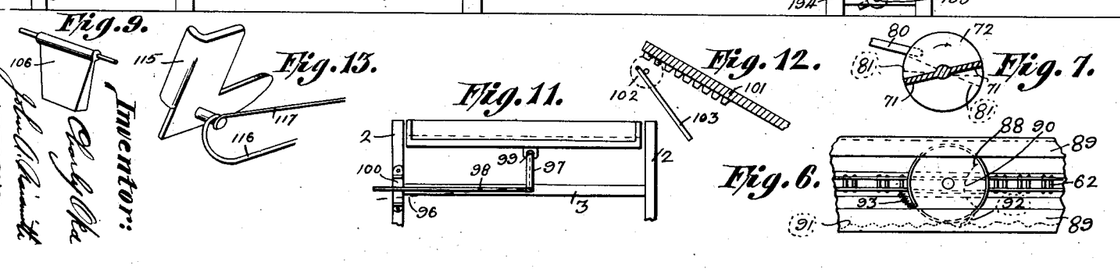
Fig. 6 is an enlarged plan view of the pan in Fig. 4.
Fig. 7 is an enlarged vertical section through the fruit depositing member shown in Fig. 3.
Fig. 9 is an enlarged perspective view of one of the retarding members shown in Fig. 8.
Fig. 11 is a detail elevation of the device used for adjusting the height of the lower end of the tray shown in Fig. 8.
Fig. 12 is a detail elevation of the device used for adjusting the slide shown in Fig. 8 in a given plane.
Fig. 13 is a perspective illustration of the scraper shown in Fig. 8.

From the first positioner above described the fruit is passed to the second positioner F, which consists of a chute 94 arranged as shown on an inclined tray 95, the lower end of the tray being adjustable as to height by means of lever 96 and link 97, pivoted at 98 and 99 and held in position in notched plate 100. It is also raised or lowered in a given plane by means of a rack 101 and pinion 102 positioned as shown in Fig. 12, the pinion having an arm 103 eccentrically connected thereto and operated by a lever 104 pivoted at 105. These adjustments permit the proper positioning of this part of the device with relation to the cutters. In chute 94 are placed a number of weighted and freely swinging gates 106 which assist in positioning the fruit on carrier chain 107, chain 107 having equally spaced feeding elements 108 thereon and interspaced cleaners 109, these latter being used for loosening any blocked fruit and cause it to move forward to its adjacent spaced feeding element. Chain 107 operates on sprockets 110 and 111, sprocket 111 being operated by shaft 111′ and sprocket 112, the latter being driven by chain 113 connected to sprocket 114 on shaft 25′. The upper portion of chute 94 is sharply curved, and to loosen any fruit that might stick at this point I provide a scraper 115 normally positioned as shown but moved forwardly against the pressure of spring 116 by link 117 and arm 118 pivoted at 119.

Figure 37:
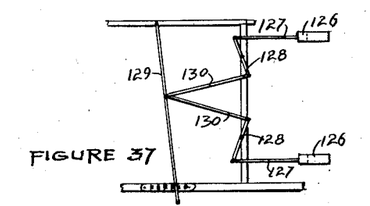
Fig. 37 is a plan view of the means for adjusting the fruit grips to the knife.

As the fruit is carried over sprocket 110 on carrier 108 it is grasped by a pair of grips 120 forming a part of the cutter and pitter G, each grip being revolubly and slidably mounted in arm 121 and adjustable with relation to each other by tension springs 122 and adjustable leaf springs 123. Each grip 120 carries a gear 124 which is in constant contact and meshing with a large gear 125, the latter being secured to a support 126 mounted on a member 3 and the support being slightly movable backwardly and forwardly by bars 127 pivoted to centrally pivoted arms 128 which are in turn connected to a lever 129 by links 130 as shown in Fig. 37. Each gear 125 carries a cam 132 on its side adapted to operate an arm 131 pivoted on bar 121 and contacting with the end of shaft 124′. Shaft 121′ to which bar 121 is secured, revolves in gear 125 and its support and is rendered slightly adjustable by springs 133 in frame 1 and driven by sprocket 134 connected to shaft 28′ by chain 135. The cams 132 operate to withdraw grips 120 at the moment the fruit is presented by carrier 108 and to immediately close the grips upon said fruit, the adjusting mechanisms providing for setting the device to various sizes of fruit. The construction described not only revolves the fruit around shaft 121′ as an axis but also, through revolving gears 124 on gears 125, revolves each fruit in its respective grips.

As the fruit is carried upwardly and forwardly in grips 120 it contacts with the cutting edge of knife 136, the same being mounted concentrically with shaft 121′ and permitted some resiliency by springs 137, and some adjustment in a vertical plane by being hinged at 138. A guide 139 is mounted in alinement with knife 136 and rendered resilient by spring 140. As the fruit approaches the lower portion of knife 136 cam 132 again opens grips 120 and the severed halves slide outwardly over sloping sides 141 of knife 136 into chutes 142, and the pit drops through opening 143 in said knife to carrier belt 144. To prevent clogging a pair of fingers 145 are positioned to extend into opening 143 to pull the pit downwardly and are operated by a lever 146 mounted on a bar 3 and operated by pins 147 set in shaft 147′, shaft 147′ being operated by sprocket 148, chain 149 and sprocket 150 on shaft 150′. The carrier belt 144 operates transversely of the machine in chute 151 and is driven by roller 152 mounted on frame 1 and driven by a belt 153 operating over rollers 154 and 155 and pulley 156 on shaft 121′. The pits are spread in receptacle 157 by a spout 158 pivoted on frame 1 at the discharge end of belt 144 and moved backward and forward by an arm 159 eccentrically connected to sprocket 160 which is driven by chain 161 connected to sprocket 162 on shaft 147′. Sprocket 150 is operated by a sprocket 163 on shaft 150′ and chain 164 which in turn is connected to a driving sprocket 165 on shaft 121′ and a driven sprocket 166 on shaft 166′.

The cut fruit in chutes 142 is removed to plate 167 by prongs 168 on rod 169, the same being moved forward and backward by a frame 170 pivoted at its lower edge to framework 1, and to which it is secured by pin 171. Frame 170 is operated on its pivots by pins 172 set in shaft 166′, the frame 170 having an edge 173 so that when forced outwardly by pin 172 it is returned to position by spring 173ª the moment said pin passes edge 172.

From plate 167 the fruit is removed to the distributing chutes by rakes 173 on rod 174 slidably mounted on bars 3, and operated by a bar 175 pivoted thereto and to the upper portion of frame 1, said bar being moved forward and backward on its pivot by pins 176 set in shaft 150′, and spring 177, the spring 177 pulling bar 175 back into position as pin 176 passes shoulder 178 in bar 175.

In order that the cut parts may be deposited in staggered relation to each other on the drying tray, they are deposited upon shelf 179 alternately at given points by distributers 180, a pair being provided for each knife. In the first position the fruit slides straight down distributers 180 to shelf 179 where it is moved forward to the inverters by a rod 181 secured to frame 170 and operating simultaneously with chute cleaning prongs 168. As the next supply of cut fruit is delivered to the distributers they are moved sidewise upon their pivots 182 by a rod 183 connected to their lower ends and to a bar 184 slidably mounted in framework 1 and moved by a spring 185, the fruit then being in the position 186. Chutes 180 are returned to a normal position by an arm 187 on the end of bar 184 operating on a cam 188 on shaft 166′.

When the fruit passes from shelf 179 it is deposited in inverters 189, each inverter receiving a single half of the fruit and being mounted upon shaft 190, the same being operated by a rack and pinion mechanism 191 which is in turn operated by a lever 192 pivoted thereto and to framework 1 and operated by pins 193 in shaft 193'. Shaft 193' is operated by sprocket 194, chain 195 and sprocket 196 on shaft 121'. After each operation by pin 193 the lever is returned to position by spring 197.

The fruit has now been cut pitted and turned over with its cut surface uppermost. From the inverters the fruit is deposited upon a canvas belt 198 operating upon rollers 199 and 200 each roller being grooved circumferentially as at 201 to form depressed grooves in the canvas to receive the fruit. Roller 199 is mounted in hangers 202 and operated by sprocket 203, chain 204 and sprocket 205 on shaft 25'. Roller 200 is mounted in a frame 206 pivoted to framework 1 and held in a raised position when not in use by detent 208 engaging notch 209, and pivoted at 210 and held by spring 211. In an operative position the catch is released and the canvas is lowered to deposit the fruit directly in tray 212.

Drying tray 212 is placed in a carriage 213 on track 214, carriage 213 having a rack on its upper edge as 214ª engaging a pinion 215 operated by a gear 216, chain 217 and sprocket 218 on shaft 218', said shaft being driven by a sprocket 219, chain 220, sprocket 221 and cone 222 operatively mounted with relation to main driving cone 22, a bell crank adjusting mechanism being provided at 223. The pinion may be raised or lowered for positioning carriage 213 by a lever 224 pivoted to frame 1 and connected to shaft 216' as shown, sufficient play for said adjustment being secured by the insertion of springs 225 between said shaft and framework 1.

It is understood of course that the relative sizes of the various parts, members and features of this device are such that the whole fruit dumped into the machine will be properly distributed and passed through one part after another and finally deposited in proper arrangement and condition for drying upon the drying tray.

In operation a box of fruit is placed in hopper 4 and dumped upon tray 38 by the power drive operating sector 6 whereupon foot lever 36 is operated and the hopper returned to its position for another box of fruit. The agitation of tray 38 spreads out the fruit so that it is fed into buckets 49 somewhat uniformly and by them carried upwardly and dumped upon tray 55. On tray 55 the fruit rolls into a screen cage, one being shown at 68, from which it is fed through a suitable aperture 69 at regular periods and placed one at a time upon trays 88 by the depositing mechanism 70 and parts coöperating therewith. The single fruit is agitated on tray 88 to place it in the position 90 whereupon it is passed through the mechanism F so that it is delivered in the desired position at desired intervals to the cutter and pitter G, which mechanism cuts the fruit into halves and removes the pits. The pits are deposited in a box 157 and the two halves are drawn forward by rods 169 and 174 into distributers 180 which so arrange the said halves that they can be drawn into inverters 189, the latter turning the cut halves over and depositing them upon the canvas belt 198 with their cut surfaces uppermost. The trays 212 are placed in carriage 213 and are advanced in such a manner that the cut fruit is deposited thereon by the belt 198 in uniform rows, each tray being removed when filled and suitably placed for drying the fruit. The carriage 213 is of course repositioned when it has been run out its full length in filling the trays.

It is also understood that changes in form, construction, proportion and operation may be made within the scope of the appended claims, and that operable combinations of certain parts may be claimed without including all the parts hereinbefore set forth as it is evident that the cutting and pitting mechanism, for instance, may be used independently of the other mechanisms described.

1 claim:

1. A fruit cutter and pitter comprising in combination, a framework supporting a fruit dumping device, a spreader, an elevator, a feeder, a first positioner, a second positioner, a fruit halving device, a pit removing device, fruit transferring devices, fruit distributing means, fruit inverting means, fruit carrying and placing means, and fruit receiving means operatively mounted with relation to each other.

2. A fruit pitter and cutter including a supporting framework, a shaft revolubly mounted therein, a knife mounted on said framework having a cutting edge concentrically positioned with relation to said shaft, adjustable fruit holders mounted to revolve about said shaft and bring the fruit therein in contact with said knife edge, means for removing the cut fruit from said knife, means for removing the pit from said fruit, and means for operating the several parts in coördinate relation to each other.

3. A fruit pitter and cutter including a supporting framework, a shaft adjustably and revolubly mounted therein, a knife mounted on said framework having a cutting edge concentrically positioned with relation to said shaft, adjustable fruit holders mounted to revolve about said shaft and bring the fruit therein in contact with said knife edge, means for removing the cut fruit from said knife, means for permitting the removal of the pit from the cut fruit, means for carrying the removed pits to a pit receptacle, and means or operating the several parts in coördinate relation with each other.

4. A fruit pitter and cutter including a supporting framework, a shaft revolubly mounted therein, a knife mounted on said framework having a cutting edge concentrically positioned with relation to said shaft, means for revolving fruit above said shaft in contact with said cutting edge whereby the fruit is halved, and means for carrying away the pit released from the halved fruit, and means for operating the several parts in coördinate relation with each other.

5. A fruit pitter and cutter including a supporting framework, a shaft revolubly mounted therein, a knife mounted on said framework having a cutting edge concentrically positioned with relation to said shaft, means for revolving fruit about said shaft in contact with said cutting edge whereby the fruit is halved, and means for carrying away the pit released from the halved fruit, said pit carrying means comprising a pair of rollers mounted on said framework, a carrier belt mounted on said rollers, a spout pivotally mounted to receive pits discharged from one end of said belt, means for operating said spout on its pivot to spread the pits discharged therefrom, and means for operating the several parts in coördinate relation with each other.

6. A fruit cutter and pitter including a supporting frame-work, a shaft revolubly mounted therein, a knife mounted on said framework having a cutting edge concentrically positioned with relation to said shaft, means for revolving fruit about said shaft in contact with said cutting edge whereby the fruit is halved, and means for carrying away the pit released from the halved fruit, and means for removing the halved fruit from said knife, means for positioning the successively halved fruits in staggered relation to each other, means for depositing the halved fruit in inverting devices, inverting devices for turning the halved fruit with its cut surfaces uppermost, and means for operating the several parts in coördinate relation with each other.

7. A fruit cutter and pitter including a supporting frame-work, a shaft revolubly mounted therein, a knife mounted on said framework having a cutting edge concentrically positioned with relation to said shaft, means for revolving fruit about said shaft in contact with said cutting edge whereby the fruit is halved, means for carrying away the pit released from the halved fruit, means for removing the halved fruit from said knife, means for positioning the successively halved fruits in staggered relation to each other, means for depositing the halved fruit in inverting devices, inverting devices for turning the halved fruit with its cut surfaces uppermost, means for depositing the inverted fruit in a drying tray, an adjustable carriage for said drying tray, and means for operating the several parts in coördinate relation with each other.

8. A fruit cutter and pitter including a supporting frame-work, a shaft revolubly mounted therein, a knife mounted on said framework having a cutting edge concentrically positioned with relation to said shaft, adjustable fruit holders mounted to revolve about said shaft and bring the fruit therein in contact with said knife edge, means for presenting a single fruit to each holder at predetermined intervals, means for removing the cut fruit from said knife, means for removing the pit from said cut fruit, and means for operating the several parts in coördinate relation with each other.

9. A fruit pitter and cutter including a framework supporting a fruit dumping device, a spreader, an elevator, a feeder, a first positioner, a second positioner and feeder, cutting, pitting and positioning devices, said dumping device comprising a hopper pivotally mounted on said framework, a sector secured to said hopper, a power driven gear meshing with said sector, resilient means for holding said gear in mesh with said sector, a foot-pedal-operated lever for disengaging said gear from said sector against the action of said spring, and means for operating all of the several parts in coördinate relation with each other.

10. A fruit cutter and pitter including a framework supporting a fruit dumping device, a spreader, an elevator, a feeder, a first positioner, a second positioner and feeder, and cutting, pitting and positioning devices, said spreader comprising a tray mounted to reciprocate in said framework, means for effecting the reciprocation of said tray, and means for operating the tray reciprocating means and the other parts in coördinate relation with each other.

11. A fruit cutter and pitter including a framework supporting a fruit dumping device, a spreader, an elevator, a feeder, a first positioner, a second positioner and feeder, and cutting, pitting and positioning devices, said feeder comprising a tray mounted to reciprocate in said framework, means for effecting the reciprocation of said tray, and means for operating the tray reciprocating means and the other parts in coördinate relation with each other, said tray having a forwardly tapering covered chute thereon, and a pair of jaws positioned adjacent the discharge end of said chute, one of said jaws being automatically adjustable with relation to the other, and additional manually operated means for adjusting said adjustable jaw.

12. A fruit cutter and pitter including a framework supporting a fruit dumping device, a spreader, an elevator, a feeder, a first positioner, a second positioner and feeder, and cutting, pitting and positioning devices, said first positioner comprising a conveyer alined with said feeder and having a plurality of spaced pans mounted thereon, means for receiving from said feeder and depositing one upon each pan, means for agitating each pan, and means for operating the several parts in coördinate relation with each other.

13. A fruit cutter and pitter including a framework supporting a fruit dumping device, a spreader, an elevator, a feeder, a first positioner, a second positioner and feeder, and cutting, pitting and positioning devices, said second positioner comprising a conveyer provided with spaced cleaning and feeding elements, a tray adjustably mounted in said framework and provided with a slot in which said conveyer operates, manually operated vertical adjustment for the forward end of said tray, a manually operated angular adjustment connected to the upper end of said tray, a chute mounted on said tray in operative relation to said conveyer and adapted to receive fruit from said first positioner, weighted members suspended in said chute and adapted to contact with the descending fruit, manually operated means for preventing clogging of the upper portion of said chute, and means for operating the several parts in coördinate relation with each other.

In testimony whereof I have hereunto affixed my signature this 28th day of March, 1919.

CHARLY OKA.